June 17, 1969 RYOTA MATSUO ET AL 3,450,806
PROCESS AND APPARATUS FOR THE FORMATION OF FILM
Filed Nov. 15, 1966
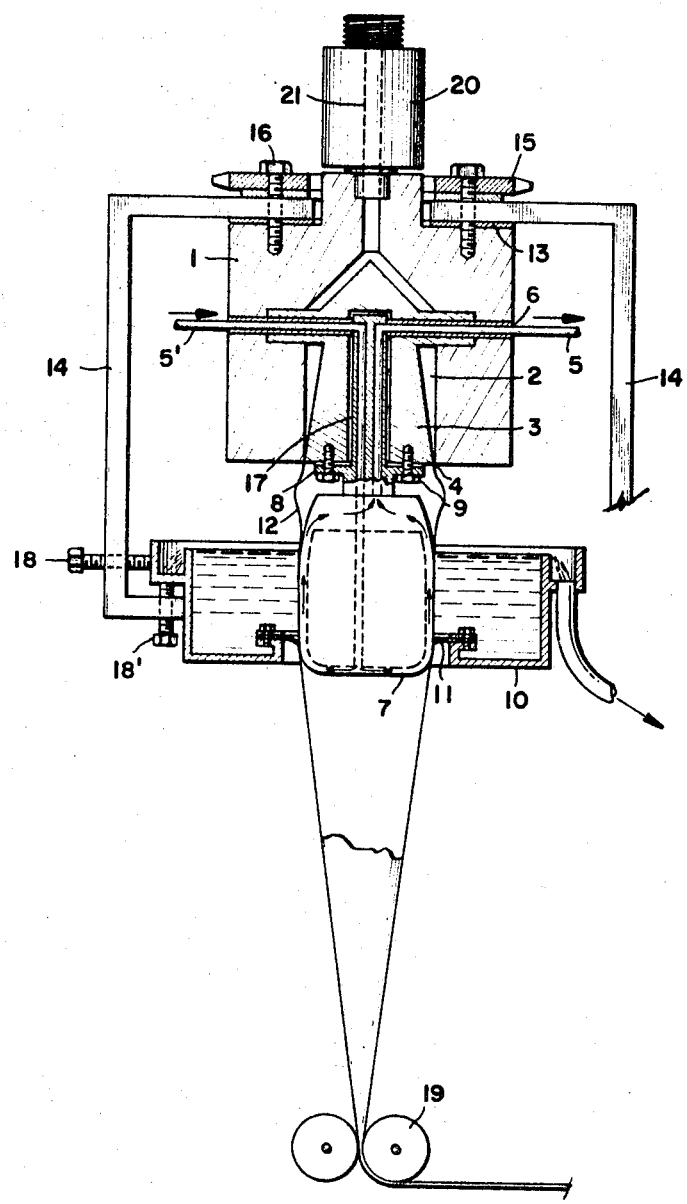
RYOTA MATSUO
SHIDO TANABE
INVENTORS
BY
PATENT ATTORNEY

United States Patent Office 3,450,806
Patented June 17, 1969

3,450,806
PROCESS AND APPARATUS FOR THE FORMATION OF FILM
Ryota Matsuo and Shido Tanabe, Yoshiwara, Japan, assignors to Esso Research and Engineering Company, a corporation of Delaware
Filed Nov. 15, 1966, Ser. No. 594,596
Claims priority, application Japan, Nov. 26, 1965, 40/72,541
Int. Cl. B29d 23/04
U.S. Cl. 264—89
24 Claims

ABSTRACT OF THE DISCLOSURE

Thermoplastic resin film is formed by extruding resin through a ring die, preliminarily cooling the extruded film with a cooling gas, and then passing the film over a mandrel positioned within a cooling liquid bath. The die, mandrel, and bath are connected in a fixed relationship to each other and are rotated simultaneously to randomize film thickness imperfections over a portion of the film surface.

---

This invention relates to a process and the apparatus for efficiently preparing films, particularly tubular film, from thermoplastic resins, and specifically for preparing a transparent tubular film with a uniform diameter and thickness from a crystalline thermoplastic resin, such as polypropylene.

A highly efficient process for the manufacture of tubular thermoplastic films has been previously described in copending application Ser. No. 564,491, filed June 30, 1966, now U.S. Patent 3,400,184, the disclosure of which is herein incorporated by reference. According to the previously described process, a molten film of thermoplastic resin is charged from an extrusion machine and is passed generally downwardly from a film die between a vertically disposed film support member and a fixed body or bath of cooling liquid. The film support member makes up one wall of the enclosure for the cooling liquid and the molten film is maintained in contact with at least a portion of the film support member by the pressure of the cooling liquid exerted against the film. Thereafter, the finished film is recoverd by passing the film through an enclosure positioned adjacent to the film support member in the bottom of the cooling bath enclosure.

For the production of tubular film a molten substantially tubular film body of thermoplastic resin was again formed using typical extrusion techniques and cooled by causing the tubular film body to slide over a cylindrical cooling mandrel that is positioned in a fixed body or bath of cooling liquid. The outside surface of the tubular film is cooled through contact with the cooling liquid and the inside surface of the film is cooled through at least partial contact with the cooling mandrel during the time the film is caused to slide over the mandrel. Preferably, the molten tubular film is partially cooled and simultaneously expanded prior to passage over the mandrel by means of a cooling gas, e.g. air or nitrogen, blown against the film on both the inner and outer surfaces of the film body. The gas blown from within the tubular film is desirably directed upwardly against the film in the zone where the film first contacts the mandrel. However, the cooling gas could be directed both upwardly and downwardly against the downwardly forwarded inside surface of the film. When the tubular film leaves the cooling mandrel the film is passed through an elastic enclosure at the bottom of the tank containing the cooling liquid in order to facilitate removal of the film from the bath without excessive leakage of the cooling liquid.

While the above-described process served well in the manufacture of highly transparent thermoplastic film, some difficulties were encountered in maintaining the thickness of the film at constant levels. The variations in thickness of the film are believed to be due to the limitation upon dimensional preciseness inherent in film extrusion dies. Since these variations in film thickness take place almost constantly at the same position on the film, rolls of the film have serious variations in diameter. When this roll of film is unwound the variation in thickness of the film remains causing difficulties in printing the film or forming the film into bags.

Now, according to the present invention, it has been found that the problems encountered with the above-described tubular film process can be avoided resulting in the formation of film rolls having substantially uniform cross-sectional diameter by rotating or oscillating the extrusion die, cooling mandrel and cooling liquid bath together at a relatively low speed. The rotation or oscillation of the die causes the thickness variation normally associated with film extrusion dies to be distributed randomly over the entire surface of the film. Hence, when the tubular film product is recovered in roll form the completed rolls have an essentially uniform cross-sectional diameter.

To achieve the desired uniformity of the final film product, it is necessary that the extrusion die, mandrel, and liquid tank be maintained at a fixed relationship to each other and rotated or oscillated simultaneously. When only the film die is rotated or oscillated, it is extremely difficult to rotate the die and maintain the die in a direction perpendicular to the vertical surfaces of the mandrel and eccentric rotation of the die with respect to the mandrel is unavoidable. Similarly, if the cooling liquid tank in which the cooling mandrel is positioned were held in a stationary position and the film die and mandrel oscillated or rotated, there would result the undesirable possibilities that a gap between the liquid seal of the cooling tank and the mandrel would be created or possibly the liquid seal would be forced into too rigid contact with the mandrel thereby hindering the sliding action of the film over the mandrel during high speed commercial operations. Hence, it is necessary in applying the present invention to retain the film die, mandrel and liquid tank in a fixed relationship to each other and to rotate or reciprocate the die, mandrel and liquid tank simultaneously.

The invention will be better understood by reference to the following drawing in which:

FIGURE 1 is a front elevation of an embodiment of the present invention with its main parts shown in cross-section.

Referring now to FIGURE 1, the extrusion die is made up of outer die 1 and inner die 3. The die members are integrally fixed together and rotatably suspended from the adapter section of a typical extruder (not shown in drawing) by means of thrust bearing 20. Between the two die members 1 and 3 is formed a passage 2 for the flow of fused thermoplastic resin. Passage 2 terminates in an annular slit 4 at the bottom of the die. Fused thermoplastic resin is introduced to passage 2 from the extruder through channel 21. Reference numeral 17 designates a metal fitting, the lower end of which is fixed a hollow tubular-shaped mandrel 7. Metal fitting 17 is inserted into a central opening located in inner die 3 and is positioned within the central opening by flange 8 and bolts 9 provided circumferentially around the metal fitting 17. Metal fitting 17 has intake tubeways 5′ for the passage of cooling liquid to the mandrel and outlet tubeways 5 for the return of the cooling liquid from the mandrel. The tubeways pass through inserting holes 6 which are bored laterally in the die.

Reference numeral 10 designates an external cooling liquid tank or cell that is positioned around the outer periphery of cooling mandrel 7. The cooling mandrel makes up one wall of the enclosure for the cooling liquid. Mandrel 7 projects through the bottom plane of the liquid tank 10. An elastic sealing material 11 is positioned around the outer periphery of the opening in the bottom of the liquid tank 10. The sealing material contacts the outer surface of the cooling mandrel and serves to maintain the cooling liquid within the cooling tank. In operation, tubular film 12 is formed by extruding a thermoplastic resin through annular slit 4. The film is simultaneously expanded and preliminarily cooled by means of a cooling gas directed upwardly from the cooling mandrel through means not shown and then passed over cooling mandrel 7. After contact with the cooling mandrel 7 and the cooling liquid maintained in cooling tank 10, the tubular film slides from the cooling zone between the mandrel and elastic seal 11.

The liquid tank 10 is suspended from outer die 1 by means of at least three metal fittings 14 which are positioned to outer die 1 by means of bolts 16. The lateral and longitudinal adjustment or alignment of the liquid tank 10 with respect to mandrel 7 is achieved with the use of adjustment bolts 18 and 18'.

The extrusion die, mandrel and cooling tank are simultaneously oscillated or rotated through the action of a driving mechanism (not shown) upon sprocket wheel 15. The sprocket wheel 15 and metal fittings 14 are each attached to the outer die by means of bolts 16. The transfer of heat from outer die 1 to the sprocket wheel and fittings 14 is prevented by means of insulation 13. After leaving the cooling mandrel, the finished tubular film product 12 is folded into a flat form by means of nip rolls 19. Thereafter, the film is passed to take-up rolls.

In the following discussion, the present invention, including both process and apparatus features, will be described with reference to polypropylene as an example of a suitable thermoplastic resin.

Film grade crystalline polypropylene is melted in the ordinary manner in a typical extrusion device and is passed in a downward direction through a tubular film die. The molten tubular film is subjected to preliminary cooling prior to contact with the cooling mandrel with a forced cooling gas such as air to partially rigidify the film. Desirably, the preliminary cooling is effected with air blown over the outside of the film by means of an air-ring placed immediately below the ring die. Additionally, a compressed cooling gas is blown inside the tubular film to cool the film and also simultaneously expand the film to a diameter slightly larger than that of the mandrel.

In commercial operations wherein a highly transparent film product is sought, it is necessary that the film body be preliminarily cooled with a cooling gas prior to contact with the liquid maintained in the cooling bath to an extent that maximum polymer viscosity is achieved without the occurrence of a "frost line" on the film prior to the film contacting the cooling liquid. Typically, polypropylene films should be at about 375 to 400° F. and polyethylene films at 300 to 325° F. immediately prior to contact with the cooling bath.

The tubular film die is rigidly connected to the cooling mandrel and the die is desirably equipped with means to transfer heat exchanging cooling liquid to and from the interior of the cooling mandrel, means to supply compressed cooling gas to the inside of the film to simultaneously expand and partially cool the film prior to it reaching the mandrel, and means to supply compressed gas to the inside of the tubular film when the film is positioned between the mandrel and the take-up nip rolls. In a preferred embodiment of this invention, cooling liquid flows through the ring die into the mandrel and is discharged. Passage of the cooling liquid through the mandrel maintains the wall of the mandrel at the desired temperature. In most instances, however, the cooling mandrel need not be internally cooled with the use of a circulating liquid since the major portion of the wall of the mandrel is cooled indirectly by the bath of cooling liquid surrounding the tubular film. Generally, it is sufficient merely to agitate a constant supply of liquid maintained within the mandrel with bubbled air or with a stirring apparatus. Water can be conveniently used as the cooling liquid medium maintained in the external bath and for indirectly cooling the mandrel.

When processing polymers of lower alkyl alpha olefins such as polypropylene, it is desirable that both the mandrel and the external cooling liquid be maintained at temperatures below about 45° C. Additionally, it is desirable that the level of the cooling liquid in the bath be maintained from about 5 to 35 millimeters above the point of desired initial contact of the film with the mandrel. When the level of the outer cooling liquid is at a level less than 5 millimeters above the point of desired initial contact with the mandrel, the inside surface of the film is at a relatively high temperature prior to contact with the mandrel and it is likely that the inside surface of the film will adhere to the mandrel. When the level of the external cooling liquid is raised more than 35 millimeters above the point of desired contact of the film with the mandrel, the excessive water pressure force the film against the upper portion of the mandrel, thereby causing the film to wrinkle.

In general when a cooling mandrel is employed in manufacturing tubular film from thermoplast resins, resin decomposition products as well as resin additives such as stabilizers, and slip agents may condense onto the cooling mandrel as a liquid or solid. The condensation of these materials tends to disrupt the process and also serves to cause the formation of opaque spots on the film. In the process of this invention, compressed cooling gas (e.g., air) is blown against the inside surface of the film at a point immediately above the zone of initial contact of the film with the mandrel. The cooling gas is preferably directed in an upward direction counter to the downward flow of film to expand and partially rigidify the film and also to prevent the condensation of resin decomposition products and resin additives at the contact zone. The use of an upwardly directed stream of cooling gas materially reduces the amount of condensed products at the point of contact of the film with the cooling mandrel.

Following the formation and cooling of the film the tubular film body is directed downwardly past an elastic seal positioned at the lower juncture of the cooling mandrel, which makes up one wall of the vessel containing the cooling liquid, and the opening in the main body of the liquid tank. Since loss of cooling liquid from the bottom of the liquid tank is substantially prevented by the liquid seal, the tubular film leaving the cooling mandrel is not accompanied by appreciable amounts of liquid.

The degree to which the film die, mandrel and liquid bath are rotated or oscillated is primarily dependent upon the extent to which it is desired to randomize the film thickness variation over the entire surface of the film body. The desirable effect of distributing the film imperfection over the entire surface of the film body can be achieved by either continuously rotating the die, mandrel and water bath at speeds varying from revolutions per minute to revolutions per hour or else by oscillating the die, mandrel and cooling bath such as by rotating the entire mechanism through a desired angle at a desired speed in one direction followed by rotating the apparatus in the opposite direction through the desired angle at the desired speed. For example, the entire apparatus can be oscillated through an angle varying from 45 to 360° in the clockwise direction and then rotated through the same angle in a counterclockwise direction at speeds varying from revolutions per minute to revolutions per hour. Preferably, in tubular film production, the total apparatus is oscillated through an angle varying from 180 to 360°. The terms "rotating" and "rotation" as used herein are meant to include both operations wherein the entire apparatus is continuously rotated in one direction and operations wherein the entire apparatus is oscillated by rotating the apparatus first in one direction and then in the opposite direction.

The invention will be better understood by reference to the following example.

EXAMPLE 1

Polypropylene having an isotactic content of about 96% and a melt index of 8.2 was extruded in a downward direction using a 65 millimeter extruder through an annular die of 250 millimeter diameter at a temperature of 250° C. A die oscillating apparatus was provided between the adapter section of the extruder and the annular die and the die was oscillated at such a speed as taking about 5 minutes to make one reciprocation within an angle of 180°. The cooling mandrel and the cooling liquid tank were fixed to and were oscillated together with the die. The tubular-shaped film formed was collapsed into sheet form and was wound into a roll.

The film roll thus formed had a completely parallel tubular shape and no variations in the diameter of the roll were noted as the film surface was parallel to the axis of the roll. Film formation proceeded in a smooth manner and no leaking of the cooling liquid from the cooling liquid tank was observed.

In a second experiment wherein the reciprocal rotation of the die, mandrel and liquid tank was stopped, the film roll formed did not show a complete parallel tubular shape as a portion of the roll, where the film was thick in the direction of the width of the roll, exhibited a convex surface and another portion of the roll exhibited a concave surface. The film taken from this irregular roll had poor flat characteristics and secondary processing such as printing or forming of the tubular film into bags was very difficult.

In another experiment only the die and cooling mandrel were oscillated and the cooling liquid tank was maintained in a fixed position. With this operation it was very difficult to completely prevent the eccentric oscillation of the mandrel with respect to the cooling liquid tank. During rotation of the mandrel, the pressure exerted by the elastic sealing ring positioned at the bottom of the liquid tank against the mandrel was not uniform. At various times during the experiment, the pressure exerted by the sealing ring was either too strong or too weak. Thus, at the point on the mandrel where the pressure exerted by the sealing ring was too weak, the cooling liquid maintained within the cooling tank leaked through the bottom of the tank. At the point on the mandrel where the pressure exerted by the sealing ring was too strong, sliding of the tubular film over the mandrel became difficult resulting in damage to the surface of the film.

What is claimed is:

1. In a process for the formation of tubular thermoplastic film comprising extruding a thermoplastic resin generally downwardly through a die in the form of a molten thermoplastic substantially tubular film body, preliminarily cooling said tubular film body to partially rigidify said film, downwardly passing said film to a cooling mandrel, said mandrel positioned in a cell containing a cooling liquid, sliding the inside surface of said tubular film downwardly over the outer surface of said cooling mandrel whereby the inside surface of said tubular film is maintained in contact with at least a portion of said mandrel by the pressure exerted by the cell cooling liquid and is cooled through contact with said mandrel and the outer surface of said film is cooled through contact with said cooling liquid in said cell, and thereafter recovering said tubular film, the improvement which comprises connecting in a fixed relationship to each other, the die, mandrel and cooling liquid cell, and rotating the die, mandrel and cooling liquid cell in said fixed relationship thereby randomizing film thickness imperfections over a portion of the film surface.

2. The process of claim 1 wherein said extruded tubular film is expanded prior to contact with said mandrel to a diameter larger than the diameter of said cooling mandrel.

3. The process of claim 2 wherein the inside surface of said tubular film is preliminarily cooled and said film body is simultaneously expanded to a diameter larger than the diameter of the cooling mandrel by passing a gas upwardly through the inside portion of said downwardly moving film body.

4. The process of claim 3 wherein said gas is passed continuously upwardly through the inside portion of said downwardly moving tubular film body.

5. The process of claim 4 wherein the outside surface of said tubular film body is preliminarily cooled prior to contact with the mandrel.

6. The process of claim 5 wherein said thermoplastic resin is polypropylene.

7. The process of claim 5 wherein the temperature of said cooling mandrel and cooling liquid is maintained below about 45°C.

8. Apparatus for manufacturing tubular film from thermoplastic film forming resinous materials which comprises, in cooperating combination:
    (a) die means for extruding generally downwardly a molten tubular film body;
    (b) means for preliminarily cooling said tubular film body to partially regidify said film;
    (c) a cooling mandrel and cell for containing a cooling liquid, said cooling mandrel positioned within said cell, said mandrel and cell positioned beneath said die means, said die means, cooling mandrel and cell connected in a fixed relationship to each other;
    (d) means for simultaneously rotating in a fixed relationship to each other the said die, mandrel and cell; and
    (e) means for forwarding said tubular film from said die means downwardly over the outer surface of said cooling mandrel.

9. The apparatus of claim 8 including means for expanding said tubular film prior to forwarding said film to said mandrel to a diameter larger than the diameter of said cooling mandrel.

10. The apparatus of claim 9 including means for preliminarily cooling the outside surface of said tubular film prior to forwarding said film to said mandrel.

11. The apparatus of claim 10 wherein said means for preliminarily cooling said tubular film and expanding said tubular film comprise means for passing a gas upwardly through the inside portion of said downwardly forwarded tubular film body.

12. The apparatus of claim 11 wherein said cooling mandrel is provided with heat exchanging cooling means.

13. In a process for the formation of tubular thermoplastic film comprising:
    (a) extruding a thermoplastic resin generally downwardly through a die in the form of a molten thermoplastic substantially tubular film body;
    (b) downwardly passing said film body to a cooling mandrel, said mandrel positioned in a cell containing a cooling liquid;
    (c) directing a cooling gas upwardly through an inside portion of said downwardly forwarded film body prior to contact with said mandrel thereby partially cooling and simultaneously expanding said film body to a diameter larger than the diameter of said mandrel and preventing the condensation of thermoplastic resin decomposition products on said mandrel at the point where the film contacts the mandrel;
    (d) sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel and the outer surface of said film body is cooled through contact with the cooling liquid in said cell; and (e) thereafter recovering said tubular film, the improvement which comprises connecting in a fixed relationship to each other, the die, mandrel and cooling liquid cell, and rotating the die, mandrel and cooling liquid cell in said fixed relationship thereby randomizing film thickness imperfections over a portion of the film surface.

14. The process of claim 13 wherein said downwardly forwarded film body is contacted with the cooling liquid contained in said cell prior to contact with said mandrel.

15. The process of claim 13 wherein the outside surface of said tubular film body is preliminarily cooled by passing air over the outside surface of the film body.

16. The process of claim 13 wherein said gas is passed continuously upwardly through the inside portion of said downwardly forwarded tubular film body.

17. The process of claim 16 wherein said gas is air.

18. The process of claim 13 wherein the gas passed upwardly through the inside portion of said downwardly forwarded film body is passed from the upper portion of the cooling mandrel at a point immediately above the point where the downwardly forwarded film first contacts the cooling mandrel.

19. The process of claim 15 wherein said thermoplastic resin is polypropylene.

20. The process of claim 19 wherein said cooling mandrel is maintained at a temperature of below about 45° C. by passing a heat exchanging cooling liquid through said mandrel.

21. The process of claim 19 wherein the temperature of said cooling mandrel and cooling liquid is maintained below about 45° C.

22. In a process for the formation of tubular thermoplastic film comprising:

(a) extruding a thermoplastic resin selected from the group consisting of polyethylene and polypropylene generally downwardly through a die in the form of a molten thermoplastic substantially tubular film body;

(b) downwardly passing the said film body to a cooling mandrel, said mandrel positioned in a cell containing water;

(c) directing air upwardly through an inside portion of said downwardly forwarded film body prior to contact with said mandrel thereby partially cooling and simultaneously expanding said film body to a diameter larger than the diameter of said mandrel and preventing the condensation of thermoplastic resin decomposition products on said mandrel at the point where the film contacts the mandrel;

(d) passing air downwardly over the outside surface of said downwardly forwarded tubular film body;

(e) sliding the inside surface of said partially cooled, expanded tubular film body downwardly over the outer surface of said cooling mandrel whereby the inside surface of said tubular film in maintained in contact with at least a portion of said mandrel by the pressure exerted by the water contained in the cell and is cooled through contact with said mandrel and the outer surface of said film is cooled through contact with the water in the cell; and (f) thereafter recovering said tubular film, the improvement which comprises connecting in a fixed relationship to each other the die, mandrel and cooling liquid cell and rotating the die, mandrel and cooling liquid cell in said fixed relationship thereby randomizing film imperfections over a portion of the film surface.

23. Apparatus for manufacturing tubular film from thermoplastic film forming materials which comprises in cooperating combination:

(a) means for extruding generally downwardly a molten tubular film body;

(b) a cooling mandrel and cell for containing a cooling liquid, said cooling mandrel positioned within said cell, and said mandrel and cell positioned beneath said extruding means, said extruding means, cooling mandrel and cell connected in a fixed relationship to each other;

(c) means for directing a cooling gas over the outside surface of said tubular film, said means positioned between said extruding means and said cooling mandrel and cell;

(d) means for simultaneously rotating in a fixed relationship to each other the said extruding means, mandrel and cell;

(e) means for forwarding said tubular film downwardly over the outer surface of said cooling mandrel; and (f) means for directing air upwardly through an inside portion of said downwardly forwarded film body prior to passage of said film body over said mandrel thereby partially cooling and simultaneously expanding said tubular film body to a diameter larger than the diameter of said mandrel and preventing the condensation of thermoplastic resin decomposition products on said mandrel at a point where the film contacts said mandrel.

24. The apparatus of claim 23 wherein said means for directing a cooling gas through an inside portion of said film body is located on said mandrel and is positioned at a point immediately above the point where the film is first brought into contact with said mandrel.

References Cited

UNITED STATES PATENTS

| | | | |
|---|---|---|---|
| 3,092,874 | 6/1963 | Fallwell | 264—95 X |
| 3,193,547 | 7/1965 | Schott | 264—95 X |
| 3,400,184 | 9/1968 | Matsuo | 264—89 |

FOREIGN PATENTS 842,064  7/1960  Great Britain.

ROBERT F. WHITE, *Primary Examiner.*

ALLEN M. SOKAL, *Assistant Examiner.*

U.S. Cl. X.R.

18—141; 264—95